D. R. LASHBROOK.
AUTOMOBILE SAFETY SIGNAL.
APPLICATION FILED DEC. 18, 1916.

1,235,335.

Patented July 31, 1917.

SLOW DOWN

Witnesses

D. R. Lashbrook, Inventor
by C. A. Snow & Co.
Attorneys

UNITED STATES PATENT OFFICE.

DELMON ROWLAND LASHBROOK, OF OWENSBORO, KENTUCKY.

AUTOMOBILE SAFETY-SIGNAL.

1,235,335.  Specification of Letters Patent.  Patented July 31, 1917.

Application filed December 18, 1916. Serial No. 137,631.

*To all whom it may concern:*

Be it known that I, DELMON ROWLAND LASHBROOK, a citizen of the United States, residing at Owensboro, in the county of Daviess and State of Kentucky, have invented a new and useful Automobile Safety-Signal, of which the following is a specification.

The present invention appertains to signals and semaphores, and aims to provide a novel and improved safety signal for use upon automobiles, to avoid confusion and collisions, the device embodying a slide or signal member and novel means for mounting and actuating the same.

It is also the object of the invention to provide a signal device of the nature indicated which is simple and inexpensive in construction, which can be applied to various automobiles, and which is practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
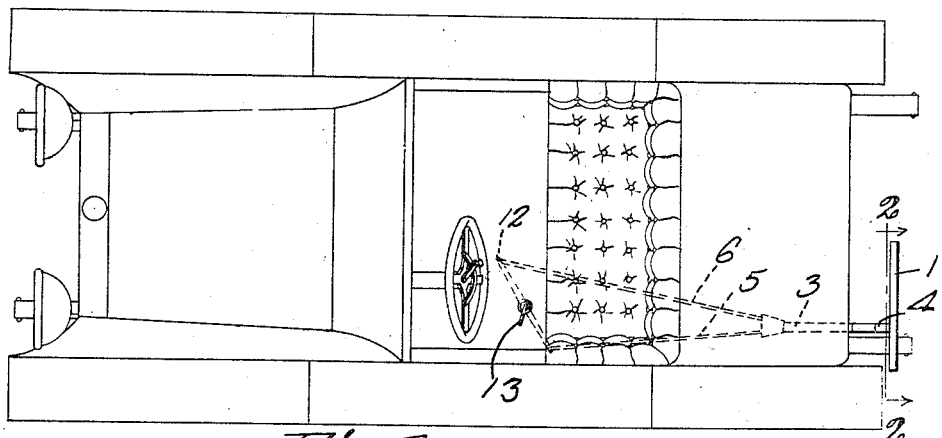
Figure 1 is a plan view of an automobile illustrating the signal device applied.
Figure 2:
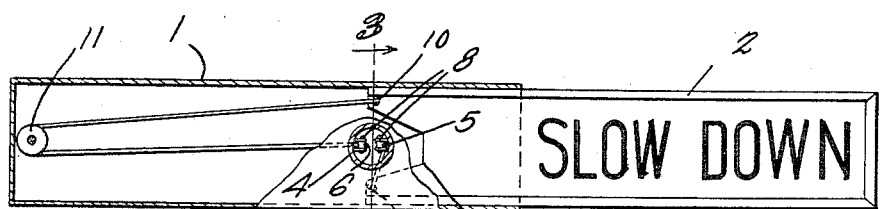
Fig. 2 is an enlarged sectional detail taken on the line 2—2 of Fig. 1.
Figure 3:
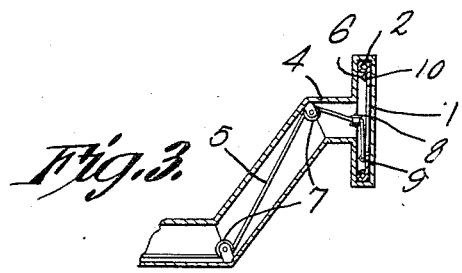
Fig. 3 is a section on the line 3—3 of Fig. 2.

The device embodies a transverse elongated casing 1 disposed at the rear of the automobile, preferably at the left hand side, and having its left hand end open. An elongated slide or signal plate 2 is slidable transversely in the casing 1 to be projected therefrom and retracted therein, said slide bearing the words "slow down" or the like, so that when the slide is projected and its legend visible, it will caution other machines in the rear to slow down to avoid collision. The slide 2 is projected when the operator desires to turn to the right or left, or to stop.

In order to mount the casing 1 at the rear end of the automobile, there is provided a longitudinal pipe or tubular member 3 fastened to the bottom or other suitable part of the vehicle body at the rear end thereof, and having its rear end offset upwardly, as at 4 and attached to one side of the casing 1 to support said casing adjacent to the tail light, so that the slide 2 can be projected from the left hand side of the vehicle body to be readily visible by the pedestrians and occupants of other vehicles.

A pair of cords or flexible elements 5 and 6 extends through the tubular member 3, and is trained around pulley wheels or guides 7 within the angles of said tubular member, and said flexible elements are also trained around pulleys or other suitable guides 8 mounted in the opening between the upwardly offset end 4 of the tubular member 3 and the casing 1 to guide said flexible elements between the casing and tubular member. One end of the flexible element 5 is connected to the inner end of the slide 2, as at 9, and the corresponding end of the flexible element 6 is attached, as at 10, to the inner end of the slide 2, the flexible element 6 being trained around a pulley wheel 11 or other suitable guide mounted within the casing 1 adjacent to the closed end thereof.

Any suitable means can be employed for reciprocating the flexible elements 5 and 6 in opposite directions for projecting and retracting the slide, it being noted that when the flexible element 5 is pulled, it will project the slide 2 which pulls the flexible element 6 with it, whereas when the flexible element 6 is pulled, the slide is retracted, pulling with it the flexible element 5. As a simple and effective means for actuating the flexible elements, a lever 12 can be provided below the bottom of the car body to the ends of which the cords or flexible elements 5 and 6 are attached, and said lever can be provided at its intermediate fulcrum with a foot piece or actuating member 13 adapted to be operated by the foot or hand of the operator for oscillating the lever, thus enabling the slide or signal member to be readily projected and retracted at will. Various other means, however, for actuating the flexible elements may be employed. The inner end of the slide 2 has a notch or recess 14 for accommodating the pulley wheel 11 when the slide is retracted, whereby the casing 1 need not be longer than the slide.

Having thus described the invention, what is claimed as new is:

A vehicle signal embodying a tubular member adapted to be carried by a vehicle and to project therefrom, a casing having one end open and one side secured to the projecting end of said tubular member near the open end of the casing, so that the casing is supported by the tubular member, a signal slide movable within the casing and projectable from its open end, said slide being movable past said end of the tubular member, a pair of guides at the juncture of said tubular member and casing, a pair of flexible elements extending through said tubular member and past said guides, said elements being attached to the slide near the inner end thereof, a guide for one flexible element mounted within the casing at the other end thereof, and a manually operable lever having an intermediate fulcrum, said elements being attached to said lever to be moved in opposite directions thereby.

In testimony that I claim the foregoing as my own, I have hereto affixed my signature in the presence of two witnesses.

DELMON ROWLAND LASHBROOK.

Witnesses:
L. R. NEWTON,
H. W. BALLOT.